(12) United States Patent
Kim et al.

(10) Patent No.: US 10,288,436 B2
(45) Date of Patent: May 14, 2019

(54) METHOD AND APPARATUS FOR RECOMMENDING A ROUTE

(71) Applicant: Samsung Electronics Co., Ltd., Gyeonggi-do (KR)

(72) Inventors: Cory Kim, Gyeonggi-do (KR); Jae-young Lee, Gyeonggi-do (KR); Sung-hyun Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 17 days.

(21) Appl. No.: 15/704,824

(22) Filed: Sep. 14, 2017

(65) Prior Publication Data

US 2018/0003514 A1  Jan. 4, 2018

Related U.S. Application Data

(63) Continuation of application No. 14/810,207, filed on Jul. 27, 2015, now Pat. No. 9,766,084, which is a continuation of application No. 12/871,404, filed on Aug. 30, 2010, now abandoned.

(30) Foreign Application Priority Data

Aug. 28, 2009 (KR) .................. 10-2009-0080721

(51) Int. Cl.
*G01C 21/34* (2006.01)
*A63B 24/00* (2006.01)
*G01C 21/36* (2006.01)

(52) U.S. Cl.
CPC ...... *G01C 21/3407* (2013.01); *A63B 24/0075* (2013.01); *G01C 21/3484* (2013.01); *G01C 21/36* (2013.01); *A63B 2220/10* (2013.01); *A63B 2220/12* (2013.01)

(58) Field of Classification Search
None
See application file for complete search history.

(56) References Cited

U.S. PATENT DOCUMENTS

| | | |
|---|---|---|
| 5,842,145 A | 11/1998 | Zimmer |
| 6,208,934 B1 | 3/2001 | Bechtolsheim et al. |
| 6,256,579 B1 | 7/2001 | Tanimoto |
| 6,470,267 B1 | 10/2002 | Nozaki |
| 7,493,214 B2 | 2/2009 | Jung et al. |

(Continued)

FOREIGN PATENT DOCUMENTS

| | | |
|---|---|---|
| EP | 2 289 395 | 2/2011 |
| JP | 2005-305003 | 11/2005 |

(Continued)

OTHER PUBLICATIONS

Korean Office Action dated Aug. 3, 2015 issued in counterpart application No. 10-2009-0080721, 9 pages.

(Continued)

*Primary Examiner* — Lail A Kleinman
(74) *Attorney, Agent, or Firm* — The Farrell Law Firm, P.C.

(57) ABSTRACT

A method and apparatus for recommending a route. The route recommending method includes obtaining user's current body information; obtaining geographic information from a current position to a destination; and determining a recommended route to the destination on the basis of the body information and the geographic information.

16 Claims, 6 Drawing Sheets

(56) References Cited

U.S. PATENT DOCUMENTS

| | | |
|---|---|---|
| 2002/0077749 A1 | 6/2002 | Doi |
| 2002/0128773 A1* | 9/2002 | Chowanic .......... G01C 21/3484 |
| | | 701/414 |
| 2006/0229809 A1 | 10/2006 | Chen |
| 2007/0185644 A1 | 8/2007 | Hirose |
| 2008/0009275 A1 | 1/2008 | Werner et al. |
| 2008/0109121 A1 | 5/2008 | Takeda |
| 2009/0291672 A1 | 11/2009 | Treves et al. |
| 2010/0057346 A1 | 3/2010 | Ehrlacher |
| 2010/0131148 A1 | 5/2010 | Camhl et al. |
| 2010/0205060 A1* | 8/2010 | Athsani .............. G01C 21/3484 |
| | | 705/14.58 |
| 2010/0292914 A1 | 11/2010 | Vepsalainen |
| 2011/0040193 A1 | 2/2011 | Seppanen et al. |

FOREIGN PATENT DOCUMENTS

| | | | |
|---|---|---|---|
| JP | 2007-064797 | | 3/2007 |
| JP | 2007-322249 | | 12/2007 |
| JP | 2007322249 A | * | 12/2007 |
| JP | 2009-068861 | | 4/2009 |
| KR | 1020060084093 | | 7/2006 |

OTHER PUBLICATIONS

Korean Office Action dated Feb. 11, 2016 issued in counterpart application No. 10-2009-0080721, 9 pages.

* cited by examiner

FIG. 3

| | TOTAL DISTANCE (310) | DISTANCE ON UPHILL ROAD (320) | DISTANCE ON DOWNHILL ROAD (330) | NUMBER OF TRAFFIC LIGHTS (340) | OBSTACLES (350) | ROAD STATE (360) | DIFFICULTY (370) |
|---|---|---|---|---|---|---|---|
| WEIGHT | 1 | 2 | −2 | 1 | 2 | 1 | 1 |
| FIRST ROUTE (301) | 10(km) | 3(km) | 3(km) | TWO | ONE | 2(FAIR) | 17 |
| SECOND ROUTE (302) | 8 | 4 | 3 | 1 | 2 | 3(POOR) | 18 |
| THIRD ROUTE (303) | 12 | 2 | 6 | 2 | 0 | 1 | 7 |

FIG. 4

|  | ESTIMATED TIME (410) | ESTIMATED CALORIES (420) | NUMBER OF SELECTIONS (430) | RECOMMENDED RANKING (440) |
|---|---|---|---|---|
| FIRST ROUTE (301) | TWO HOURS | 800(kcal) | ONCE | SECOND |
| SECOND ROUTE (302) | 4 | 1600 | 4 | 2 |
| THIRD ROUTE (303) | 2.5 | 700 | 2 | 1 |

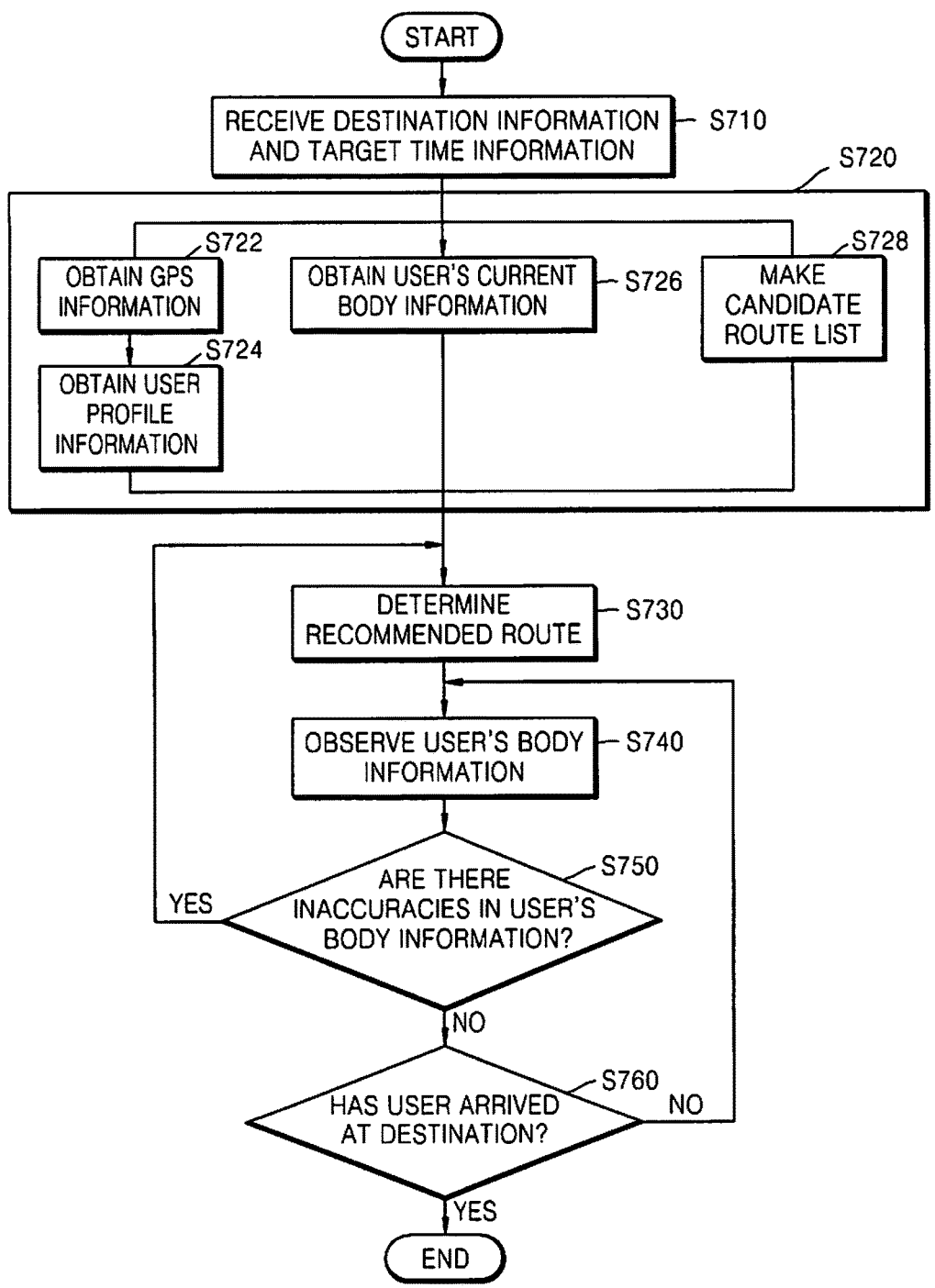

METHOD AND APPARATUS FOR RECOMMENDING A ROUTE

PRIORITY

This application is a Continuation application of U.S. application Ser. No. 14/810,207, filed in the U.S. Patent and Trademark Office on Jul. 27, 2015, which is a Continuation Application of U.S. application Ser. No. 12/871,404, filed in the U.S. Patent and Trademark Office on Aug. 30, 2010, which claims priority to Korean Patent Application No. 10-2009-0080721, filed in the Korean Intellectual Property Office on Aug. 28, 2009, the disclosures of which are incorporated herein in their entirety by reference.

BACKGROUND OF THE INVENTION

1. Field of the Invention

The present invention relates to a method and apparatus for recommending a route, and more particularly, to a route-recommending method and apparatus that dynamically changes a recommended route based on a user's body information.

2. Description of the Related Art

Although the number of automobiles has increased rapidly, road networks have not been expanded and thus traffic jams are becoming more serious in many city areas. To avoid traffic jams and safely travel on unknown roads, route-guiding apparatuses with a Global Positioning System (GPS) function have been widely used.

Such route guiding apparatuses have been used not only by vehicle drivers but also by road walkers, hikers and cyclists.

SUMMARY OF THE INVENTION

The present invention provides a method and apparatus for recommending a route.

According to an aspect of the present invention, there is provided a route recommending method including obtaining a user's current body information; obtaining geographic information from a current position to a destination; and determining a recommended route to the destination on the basis of the body information and the geographic information.

Determining the recommended route may further include a determination based upon user profile information including at least one of a user's past body information and route selection hi story information.

The route recommending method may further include updating the body information at some interval; and selectively changing the recommended route on the basis of the updated body information.

The route recommending method may further include, if an intersection exists within a certain range from the current position, updating the body information; and selectively changing the recommended route on the basis of the updated body information.

The route recommending method may further include receiving map data; and outputting map data showing the recommended route.

The route recommending method may further include receiving at least one of a signal for establishing a destination, a signal for establishing a target traveling time, and a signal for selecting a route.

Body information may include at least one of an electrocardiogram (ECG), brainwave, stress index, bone density index, body mass index, caloric consumption, and the user's age.

Geographic information may include at least one of the distance of a candidate route, the locations of support facilitates, the road conditions, the distance on uphill roads, the distance on downhill roads, and other obstacles.

The route recommending method may further include performing route guidance according to the recommended route.

According to another aspect of the present invention, there is provided a route recommending apparatus including a body information obtaining unit for obtaining a user's current body information; a geographic information obtaining unit for obtaining geographic information from a current position to a destination; and a route determining unit for determining a recommended route based upon body information and geographic information.

BRIEF DESCRIPTION OF THE DRAWINGS

The above and other features and advantages of the present invention will become more apparent by describing in detail certain embodiments thereof with reference to the attached drawings in which:

FIG. 3 illustrates a table including geographic information, according to an embodiment of the present invention;

FIG. 4 illustrates a table showing a candidate route list, according to an embodiment of the present invention;

FIG. 7 is a flowchart illustrating a method of recommending a route according to another embodiment of the present invention.

DETAILED DESCRIPTION OF EMBODIMENTS OF THE INVENTION

Certain embodiments of the present invention will be described in detail with reference to the accompanying drawings.

Figure 1:
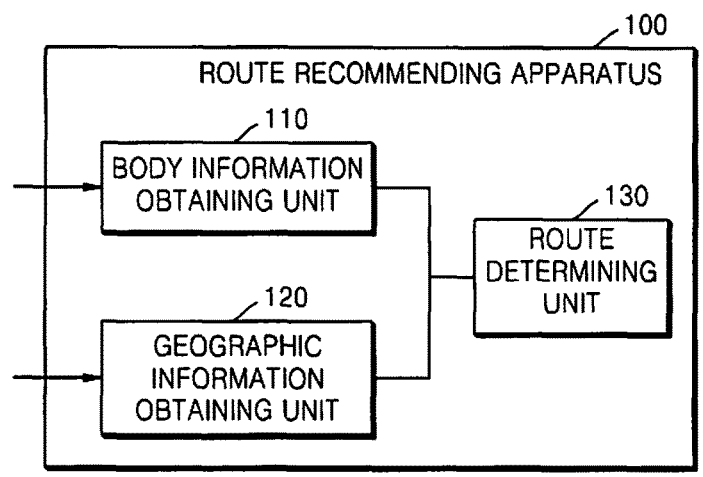
FIG. 1 is a block diagram illustrating a route recommending apparatus according to an embodiment of the present invention.

FIG. 1 illustrates a route recommending apparatus 100, according to an embodiment of the present invention.

The route recommending apparatus 100 according to an embodiment of the present invention may include a body information obtaining unit 110, a geographic information obtaining unit 120, and a route determining unit 130. The route recommending apparatus 100 may be installed in the form of a hardware module or a combination of a hardware module and a software module inside a portable apparatus, which includes for example, a mobile phone.

The body information obtaining unit 110 obtains a user's current body information. The body information may include any information related to the user's physical condition. For example, the body information may include blood pressure, electrocardiogram (ECG), heart rate, skin temperature, breath condition, weight, height, body motion, electromyogram, perspiration, and/or skin conductivity.

The body information obtaining unit 110 may update the user's current body information in real time or update the user's current body information whenever a predetermined condition is satisfied. A method of establishing the predetermined condition may vary. For example, the body information obtaining unit 110 may update the user's current body information whenever a predetermined period of time elapses or when a user approaches a nearby intersection. As described herein, updating the user's current body information means that the body information obtaining unit 110 re-obtains the user's body information. The term "intersection" means a point where at least two routes cross each other. When a user approaches the intersection, the body information obtaining unit 110 updates the user's body information so that route determining unit 130 (to be described later) determines the route to be selected from the intersection.

The geographic information obtaining unit 120 obtains geographic information from a current position to a destination. The geographic information obtaining unit 120 may obtain geographic information about each route that can be used to reach a destination from the user's current position. The geographic information may include any information related to topography or geography, such as position of a route, total length of a route, an uphill distance on a road, a downhill distance on a road, road conditions, the number of route facilities including crosswalks, etc. The geographic information may be obtained from an external apparatus or a GPS module that is connected to the route recommending apparatus 100 via a network, or may be stored in the route recommending apparatus 100.

The route determining unit 130 determines a recommended route to the destination on the basis of body information and geographic information. The route determining unit 130 may search all possible routes that can be used to reach the destination from the current position, and may determine a recommended route that is the most appropriate route for a user in view of the body information.

The route determining unit 130 may also determine a recommended route on the basis of a user's profile information. The user profile information may include any information related to a user, for example, past body information, fitness history, medical history, preferred route, etc. The user profile information may be stored in the route recommending apparatus 100 or received from the outside via a network. The route recommending apparatus 100 may include a plurality of items of user profile information corresponding to each of a plurality of users. The recommended route determining unit 130 may determine which profile information to use on the basis of user's body information or a user's input.

After the body information obtaining unit 110 updates the body information, the route determining unit 130 selectively determines whether to change the recommended route. If the body information is updated in real time, the route determining unit 130 may determine whether to change the recommended route only when variation of the body information is greater than a threshold value. If the body information is updated at a predetermined time interval or if the body information is updated when a distance difference between the user and an intersection is less than the threshold value, the route determining unit 130 may determine whether to change the recommended route whenever new body information is presented.

If the recommended route has changed, the route determining unit 130 may inform the user through a sound or vibration that indicate that the recommended route has been changed.

In addition to the route determining unit 130, a route guiding unit (not shown) may perform route guidance without a user's input. The route guiding unit may even display a candidate route list so that a user may directly select the recommended route. In this case, the candidate route list may show the recommended route. If the user selects the recommended route from the candidate route list, the route guiding unit may guide the user along the recommended route. On the other hand, if the user selects another route, the route guiding unit may guide the user along the selected route.

Figure 2:
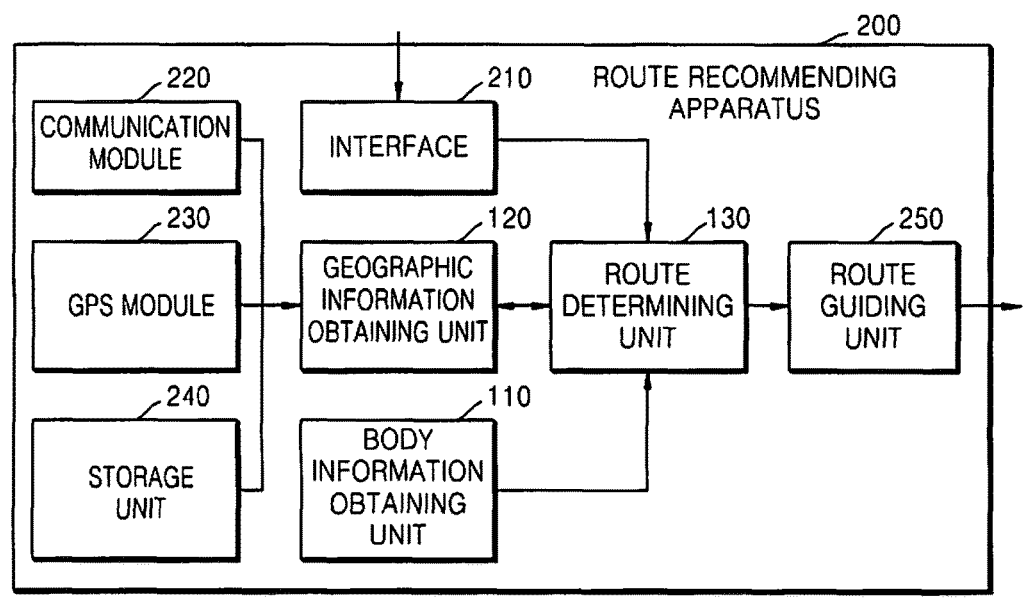
FIG. 2 is a block diagram illustrating a route recommending apparatus according to another embodiment of the present invention.

FIG. 2 illustrates a route recommending apparatus 200, according to another embodiment of the present invention.

The route recommending apparatus 200 may include an interface 210, a body information obtaining unit 110, a geographic information obtaining unit 120, a route determining unit 130, a communication module 220, a GPS module 230, a storage unit 240, and a route guiding unit 250. The body information obtaining unit 110, the geographic information obtaining unit 120, and the route determining unit 130 that are included in the route recommending apparatus 200 may perform the same functions as those described with respect to FIG. 1.

The interface 210 receives an input signal from the outside. For example, the interface 210 may receive a destination and a target traveling time that are input by a user, or may receive a route selected by the user.

The communication module 220 may receive map data, geographic information or information about other users' preferred routes from a wired or wireless network.

The GPS module 230 may receive location information from a GPS server or satellite network.

The storage unit 240 may store at least one of a user's profile information, map data, and geographic information.

The route guiding unit 250 may perform route guidance according to the selected route.

Hereinafter, sequential operations of the route recommending apparatus 200 will be described.

First, a user inputs a destination through the interface 210. The user may also input a target time to the destination.

The body information obtaining unit 110 obtains the user's current body information. The body information obtaining unit 110 preferably directly obtains the user's body information through a sensor or sensor network.

The geographic information obtaining unit 120 obtains geographic information about a current position, the destination, and all points in-between. The geographic information obtaining unit 120 may obtain the geographic information from the communication module 220, the GPS module 230, or from the storage unit 240.

Next, the route determining unit 130 determines a recommended route on the basis of the geographic information, body information and user input. As described above, the route determining unit 130 may also determine the recommended route on the basis of user profile information.

The route determining unit 130 provides a candidate route list to a user. The candidate route list may show the recommended route.

The user selects any one of the candidate routes shown in the candidate route list through the interface 210.

The route guiding unit 250 performs route guidance according to the selected route. The route guiding unit 250 may output map data to a display apparatus, or may inform a user of a crossroad or a dangerous area through a sound or vibration indicator.

While the route guiding unit 250 performs route guidance, if the user approaches an intersection, the body information obtaining unit 210 updates body information.

The route determining unit 130 determines whether to change the recommended route on the basis of the updated body information. For example, when the user's heart rate suddenly changes or when the user's body temperature increases greater than a threshold value, or when the amount of sweat produced is greater than a threshold value, the route determining unit 130 may determine that the user is not fit to use the route. Accordingly, the route determining unit 130 may change the route to a new route, which includes better road conditions such as flat or downhill roads, as a recommended route.

According to an embodiment, if the user approaches an intersection, the route determining unit 130 may inform a user in advance through sound or vibration that the recommended route may be changed.

FIG. 3 illustrates geographic information, according to an embodiment of the present invention.

In FIG. 3, the geographic information corresponding to each candidate route is shown. The geographic information includes information about, for example, a total distance 310 from a current position to a destination, a distance on an uphill road 320, a distance on a downhill road 330, the number of traffic lights 340, existence and number of any obstacles 350, and the road state 360. In addition, the geographic information may include any information related to topography or geography.

The recommended route determining unit 130 may determine the difficulty of each route on the basis of the geographic information. In this case, a different weight may be applied to each item. In FIG. 3, it is assumed that a weight '1' is applied to the total distance 310, the number of traffic lights 340, and the road state 350, a weight '2' is applied to the obstacle 350, and a weight '−2' is applied to the distance of a downhill road 330.

In this case, the difficulty 370 of a first route 301 satisfies the equation $(11*1)+(3*2)+(3*(-2))+(2*1)+(1*2)+(2*1)=17$, the difficulty 370 of a second route 302 satisfies the equation $(8*1)+(4*2)+(3*(-2))+(1*1)+(2*2)+(3*1)=18$, and the difficulty 370 of a third route 303 satisfies the equation $(12*1)+(2*2)+(6*(-2))+(2*1)+(0*2)+(1*1)=7$. That is, it is most difficult to reach the destination along the second route 302, and it is least difficult to reach the destination along the third route 303. The above-mentioned method of calculating route difficulty is just an example, and thus difficulties of candidate routes may be calculated by additionally using other information or other mathematical relationships.

The recommended route determining unit 130 may determine a route which is the most suitable for a user on the basis of such difficulty information and the user's current body information.

FIG. 4 illustrates a candidate route list according to an embodiment of the present invention.

The candidate route list according to an embodiment of the present invention includes estimated time information 410, estimated calories information 420, a number of selections information 430, and recommended ranking information 440. In addition, the candidate route list may include any information that may be relevant to a user's selection.

The estimated time information 410 is the estimated time for arriving at a destination via a candidate route.

The estimated calories information 420 is the estimated calories consumed by a user when he arrives at the destination via a candidate route.

The number of selections information 430 is the number of times a user has selected a candidate route in the past.

The recommended ranking information 440 is the ranking of a candidate route according to another user's recommendation. In this case, the recommended ranking information 440 may be based upon route information recommended by a user in a group having information similar to the user of the route recommending apparatus 100.

The candidate route list may be produced using data from a user's profile. For example, if a history of selecting the candidate route exists, the user's profile may include information about time the taken and the calories consumed when using the specific candidate route. When the user selects the same destination, the candidate route list may be generated on the basis of the user's profile.

The recommended route determined by the route determining unit 130 is shown in the candidate route list. If the route determining unit 130 determines that the user is physically fit and that a target traveling time entered by the user corresponds with the estimated time information 410 of the second route 302, the route determining unit 130 may determine the second route 302 is the recommended route. In FIG. 4, the recommended route is shown as a highlighted line so that the user may easily recognize it.

A recommended route may be determined based on user's preferences. As an example, if the user wants a fastest route, the fastest route (301) is determined as a recommendation and if the user wants a hardest route, the hardest route (302) is determined as a recommendation.

Figure 5:
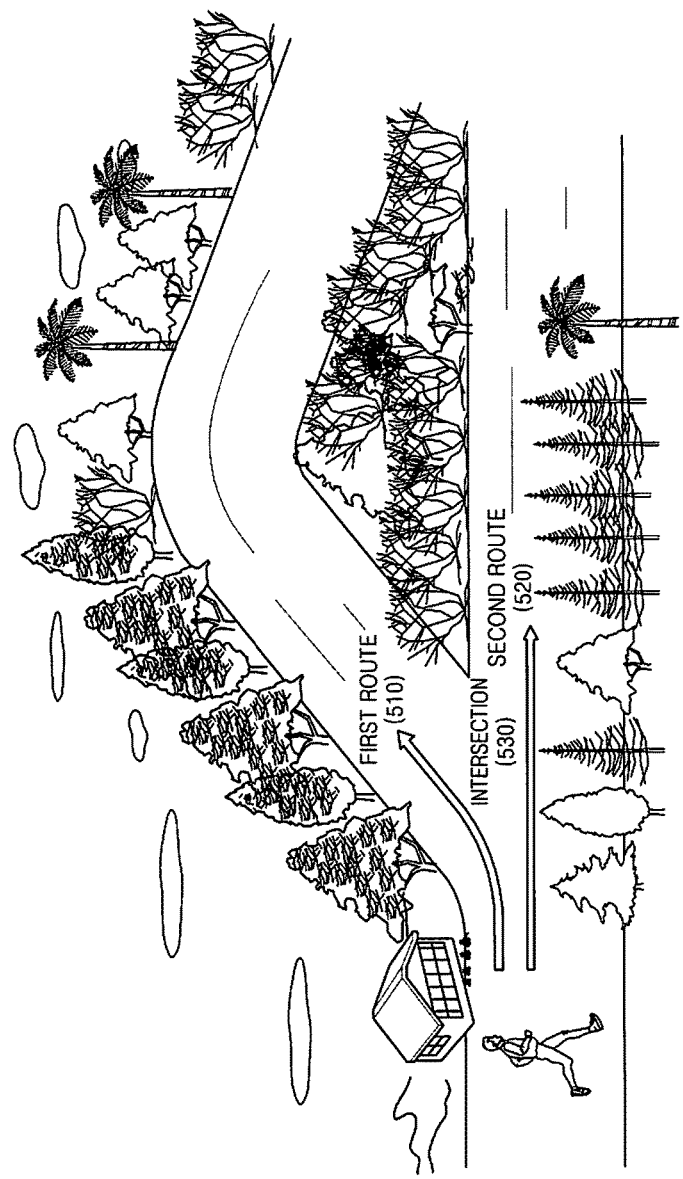
FIG. 5 is a diagram which illustrates a method of changing a recommended route using a route recommending apparatus, according to an embodiment of the present invention.

FIG. 5 illustrates a method of changing a recommended route in the route recommending apparatus 100, according to an embodiment of the present invention.

First, when a user operates the route recommending apparatus 100, the route recommending apparatus 100 obtains the user's current body information and determines a recommended route based upon such information. Since a first route 510 is a hiking trail having many uphill roads, when a user uses the first route 510, the user may burn many calories. On the other hand, if the user selects the second route 520, he may use less energy because the terrain is easier. It is assumed now that the route recommending apparatus 100 determines the first route 510 as a recommended route.

The route recommending apparatus 100 begins route guidance according to the first route 510. The user approaches an intersection 530 while jogging along the first route 510. In this case, the route recommending apparatus 100 updates the user's body information and determines whether to change the recommended route on the basis of the updated body information. For example, if the route recommending apparatus 100 determines that the user overexerted himself on the basis of a his heart rate and body temperature, the route recommending apparatus 100 may change the recommended route from the first route 510 to the easier second route 520. On the other hand, if the route recommending apparatus 100 determines that the user used less energy on the basis of a user's heart rate and body temperature, the route recommending apparatus 100 may not change the recommended route. The route recommending apparatus 100 continues route guidance according to the first route 510.

Figure 6:
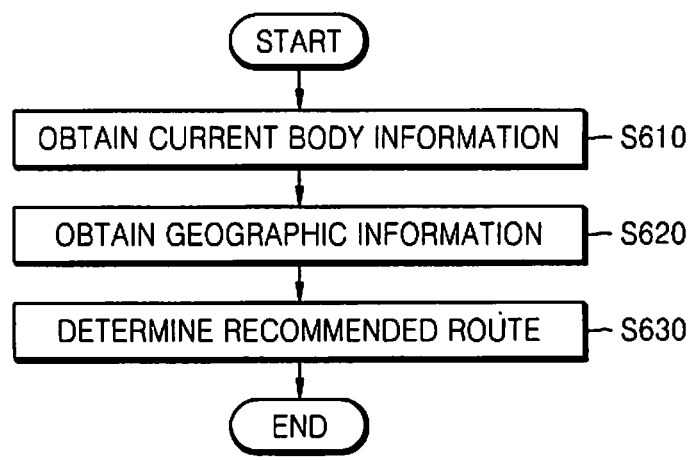
FIG. 6 is a flowchart illustrating a method of recommending a route according to an embodiment of the present invention.

FIG. 6 illustrates a method of recommending a route, according to an embodiment of the present invention.

In step s610, the user's current body information is obtained.

In step s620, geographic information from a current position to a destination is obtained.

In step s630, a recommended route is determined on the basis of the body information and the geographic information. The recommended route may also be determined on the basis of user profile information including at least one of the user's past body information and route selection hi story information.

Afterwards, the body information is updated at a predetermined time interval or when a user approaches an intersection from within a critical distance. The recommended route may be selectively changed on the basis of the renewed body information.

FIG. 7 illustrates a method of recommending a route, according to another embodiment of the present invention.

In step s710, a user selects destination information and target time information.

In step s720, information required to determine a recommended route is obtained.

In step s722, GPS information about a current position and a destination is obtained.

In step s724, user profile information is obtained.

In step s726, the user's current body information is obtained.

In step s728, a candidate route list is obtained on the basis of the GPS information.

In step s730, a recommended route is determined on the basis of the obtained information.

In step s740, route guidance according to the recommended route is performed, and at the same time, the user's body information is monitored in real time.

In step s750, it is determined whether an intersection exists or not, or whether there are inaccuracies in the user's body information. If the inspection determines that there are inaccuracies in the user's body information, step s730 is performed again to re-determine the recommended route. If it is determined that the intersection does not exist of there is no inaccuracy in the user's body information, step s760 is performed.

In step s760, it is determined whether a user has arrived at a destination. If the user has arrived at the destination, the route guidance is finished. If the user has not yet arrived at the destination, step s740 is repeatedly performed.

The present invention can also be embodied as computer readable codes on a computer readable recording medium. The computer readable recording medium is any non-transitory data storage device that can store data which can be thereafter read by a computer system. Examples of the computer readable recording medium include read-only memory (ROM), random-access memory (RAM), CD-ROMs, magnetic tapes, floppy disks, optical data storage devices, and etc. The computer readable recording medium can also be distributed over network-coupled computer systems so that the computer readable code is stored and executed in a distributed fashion.

While the present invention has been shown and described with reference to certain embodiments thereof, it will be understood by a person of ordinary skill in the art that various changes in form and details may be made therein without departing from the spirit and scope of the present invention as defined by the following claims. The described embodiments should be considered in a descriptive sense only and not for purposes of limitation. Therefore, the scope of the invention is defined not by the detailed description of the invention but by the claims. All differences within the scope are intended to be construed as embodiments of the present invention.

What is claimed is:

1. A route recommending apparatus comprising:
    a geographic information obtaining unit for obtaining geographic information related to a plurality of routes used to reach a destination;
    a body information obtaining unit for obtaining physical information of a user;
    a route determining unit for generating a new route for the user based on the geographic information, the physical information, and user profile information which comprises past body information of the user, which is updated based on a predetermined condition including at least one of when a predetermined period of time elapses and when a user approaches a nearby intersection, and at least one of workout history of the user, a medical record of the user, and a preferred route record of the user; and
    a user interface for displaying the new route to the user via display apparatus of the route recommending apparatus,
    wherein the geographic information obtaining unit, the body information obtaining unit, the route determining unit, and the user interface are implemented as at least one hardware processor.

2. The route recommending apparatus of claim 1, further comprising:
    a guiding unit for guiding the user,
    wherein the a route determining unit is further configured to generate a plurality of candidate routes including the new route based on the physical information, the user profile information, and the geographic information,
    wherein the user interface is further configured to display the plurality of candidate routes, to receive a user input for selecting a route among the plurality of candidate routes, and
    wherein the guiding unit guides the user along the selected route.

3. The route recommending apparatus of claim 1, further comprising:
    a guiding unit for guiding the user along the generated new route,
    wherein the route determining unit is further configured to provide a notice of the generated new route to the user.

4. The route recommending apparatus of claim 3, wherein the notice of the generated new route is provided using at least one of an alarm sound and a vibration.

5. The route recommending apparatus of claim 1, wherein the user profile information is stored in a memory of the route recommending apparatus.

6. The route recommending apparatus of claim 1, wherein the user profile information is obtained via a network communication.

7. The route recommending apparatus of claim 1, wherein the route determining unit is further configured to generate the new route based on a determination of a physical condition included in the physical information of the user exceeding a predetermined threshold value.

8. The route recommending apparatus of claim 7, wherein the physical condition included in the physical information comprises at least one of an electrocardiogram (ECG), a brainwave, a stress index, a bone density index, a body mass index, a caloric consumption, and an age of the user.

9. A route recommending method used by an electronic device, the method comprising:

obtaining geographic information related to a plurality of routes used to reach a destination;

obtaining physical information of a user of the electronic device; and generating a new route for the user based on the geographic information, the physical information, and user profile information which comprises past body information of the user, which is updated based on a predetermined condition including at least one of when a predetermined period of time elapses and when a user approaches a nearby intersection, and at least one of a workout history of the user, a medical record of the user, and a preferred route record of the user.

10. The method of claim 9, further comprising:

generating a plurality of candidate routes including the new route based on the physical information, the user profile information, and the geographic information;

displaying, on the electronic device, the plurality of candidate routes;

receiving a user input for selecting a route among the plurality of candidate routes; and guiding the user along the selected route.

11. The method of claim 9, further comprising:

providing a notice of the generated new route to the user; and guiding the user along the generated new route.

12. The method of claim 11, wherein the notice of the generated new route is provided using at least one of an alarm sound and a vibration.

13. The method of claim 9, wherein the user profile information is stored in a memory of the electronic device.

14. The method of claim 9, wherein the user profile information is obtained via a network communication.

15. The method of claim 9, wherein generating the new route comprises:

generating the new route based on a determination of a physical condition included in the physical information of the user exceeding a predetermined threshold value.

16. The method of claim 15, wherein the physical condition included in the physical information comprises at least one of an electrocardiogram (ECG), a brainwave, a stress index, a bone density index, a body mass index, a caloric consumption, and an age of the user.

* * * * *